United States Patent
Yin

(10) Patent No.: US 10,015,773 B2
(45) Date of Patent: Jul. 3, 2018

(54) ELECTRONIC DEVICE AND METHOD FOR PROMPTING NEW EVENT

(71) Applicant: Chiun Mai Communication Systems, Inc., New Taipei (TW)

(72) Inventor: Chen-Hsuan Yin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/006,645

(22) Filed: Jan. 26, 2016

(65) Prior Publication Data

US 2017/0105191 A1    Apr. 13, 2017

(30) Foreign Application Priority Data

Oct. 8, 2015   (CN) .......................... 2015 1 0640783

(51) Int. Cl.
| | |
|---|---|
| *H04W 4/12* | (2009.01) |
| *H04W 68/00* | (2009.01) |
| *H04W 68/04* | (2009.01) |
| *H04M 1/725* | (2006.01) |
| *H04M 19/04* | (2006.01) |
| *H04M 1/57* | (2006.01) |

(52) U.S. Cl.
CPC ..... *H04W 68/005* (2013.01); *H04M 1/72519* (2013.01); *H04M 19/04* (2013.01); *H04W 4/12* (2013.01); *H04W 68/04* (2013.01); *H04M 1/575* (2013.01); *H04M 1/72552* (2013.01); *H04M 2250/60* (2013.01)

(58) Field of Classification Search
CPC ....... G06Q 10/10; G06Q 10/107; H04W 4/12; H04W 68/00; H04W 4/16; H04W 68/005; H04W 68/02

USPC ............ 455/414.1, 414.3, 466; 715/705, 715
See application file for complete search history.

(56) References Cited

U.S. PATENT DOCUMENTS

| | | | |
|---|---|---|---|
| 2005/0174242 A1* | 8/2005 | Cohen .................. | G08B 25/016 340/573.4 |
| 2007/0133771 A1* | 6/2007 | Stifelman ............... | H04M 3/48 379/142.01 |
| 2010/0223569 A1* | 9/2010 | Vuong ................ | G06F 3/04817 715/772 |
| 2012/0030623 A1* | 2/2012 | Hoellwarth ......... | G06F 3/04817 715/811 |
| 2014/0280635 A1* | 9/2014 | Bengochea ............. | H04L 51/22 709/206 |
| 2015/0172877 A1* | 6/2015 | Wang ................ | H04M 3/42195 455/412.2 |
| 2015/0261387 A1* | 9/2015 | Petersen ................. | G06F 3/013 715/765 |

FOREIGN PATENT DOCUMENTS

| | | |
|---|---|---|
| CN | 101309324 A | 11/2008 |
| CN | 103024188 A | 4/2013 |
| CN | 104639731 A | 5/2015 |

\* cited by examiner

*Primary Examiner* — Allahyar Kasraian
(74) *Attorney, Agent, or Firm* — ScienBiziP, P.C.

(57) ABSTRACT

A prompting method using an electronic device includes detecting whether the electronic device receives a new event. A number of times that new events of the electronic device are not processed is calculated when the received new event is not processed. A prompting device is controlled to transmit a notice of the received new event according to the calculated number of times.

15 Claims, 4 Drawing Sheets

| Calcualted number of times (Unit: times) | Frequency | Prompting units |
|---|---|---|
| 1~3 | Every 20 minutes | Display device |
| 4~5 | Every 15 minutes | Display device, lighting device |
| 6~8 | Every 10 minutes | Display device, lighting device, vibration device |
| > 8 | Every 5 minutes | Display device, lighting device, vibration device, speaker |

| Calcualted number of times (Unit: times) | Frequency | Prompting units |
|---|---|---|
| 1~3 | Every 20 minutes | Display device |
| 4~5 | Every 15 minutes | Display device, lighting device |
| 6~8 | Every 10 minutes | Display device, lighting device, vibration device |
| > 8 | Every 5 minutes | Display device, lighting device, vibration device, speaker |

FIG. 4

ELECTRONIC DEVICE AND METHOD FOR PROMPTING NEW EVENT

CROSS-REFERENCE TO RELAYED APPLICATIONS

This application claims priority to Chinese Patent Application No. 201510640783.4 filed on Oct. 8, 2015, the contents of which are incorporated by reference herein.

FIELD

The subject matter herein generally relates to managing technology, and particularly to an electronic device and a prompting method using the electronic device.

BACKGROUND

Electronic devices can be configured to receive data. The data can be displayed on the electronic device. When an electronic device receives a new event such as a new short message, the electronic device may display a message on a display device to inform a user of the new short message.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4 illustrates one example of a relationship between a calculated number of times of new events not processed and a period of time of prompting.

DETAILED DESCRIPTION

Figure 1:
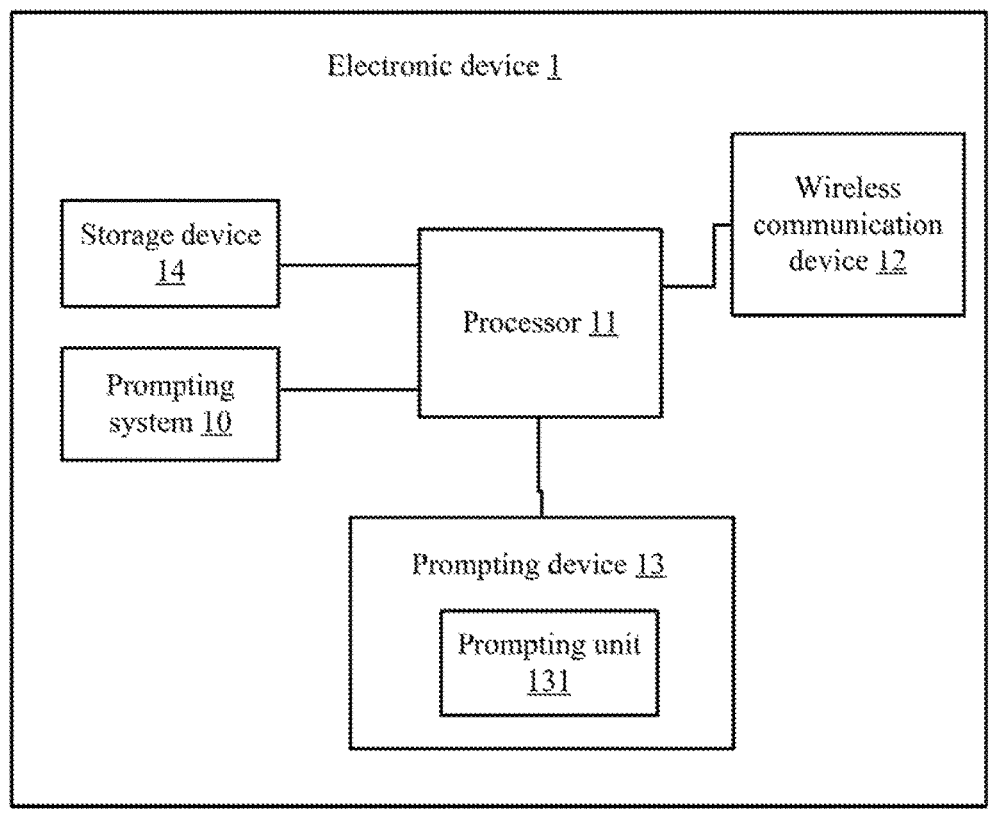
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, an electronic device 1 may include, but are not limited to, a prompting system 10, at least one processor 11, a wireless communication device 12, a prompting device 13, and a storage device 14. The above components are electrically connected to each other. The electronic device 1 can be a mobile phone, a computer, or any other suitable device. FIG. 1 illustrates only one example of the electronic device 1 that can include more or fewer components than illustrated, or have a different configuration of the various components in other embodiments.

The prompting system 10 can be used to detect a new event of the electronic device 1 received via the wireless communication device 12. The prompting system 10 can further control the prompting device 13 to transmit a notice when the new event is not processed.

In at least one embodiment, the wireless communication device 12 can be a radio frequency transceiving device, or a WIFI device. The new event may include, but are not limited to, a new coming call, a new short message, a new email, and/or other new message received from a predetermined application such as the "Line" of the electronic device 1.

The prompting device 13 can include one or more prompting unit 131, the one or more prompting unit 131 can respectively transmit a different notice. For example, the one or more prompting unit 131 may include, but are not limited to, a display device, a speaker, a vibration device, a lighting device, and/or an alarm device.

The storage device 14 can be an internal storage device, such as a flash memory, a random access memory (RAM) for temporary storage of information, and/or a read-only memory (ROM) for permanent storage of information. The storage device 14 can also be an external storage device, such as a smart media card, a secure digital card, and/or a flash card.

Figure 2:
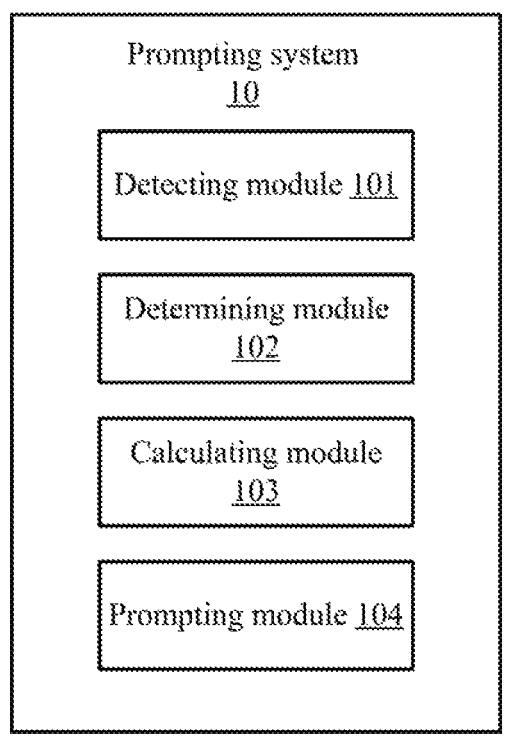
FIG. 2 is a block diagram of one embodiment of functional modules of a prompting system installed in the electronic device of FIG. 1.

FIG. 2 illustrates a block diagram of one embodiment of functional modules included in the prompting system 10. In at least one embodiment, the prompting system 10 can include a detecting module 101, a determining module 102, a calculating module 123, and a prompting module 104. The modules 101-104 can include computerized codes in a form of one or more programs, which are stored in the storage device 14, and are executed by the at least one processor 11. Details will be provided in conjunction with a flow chart of FIG. 3 in the following paragraphs.

Figure 3:
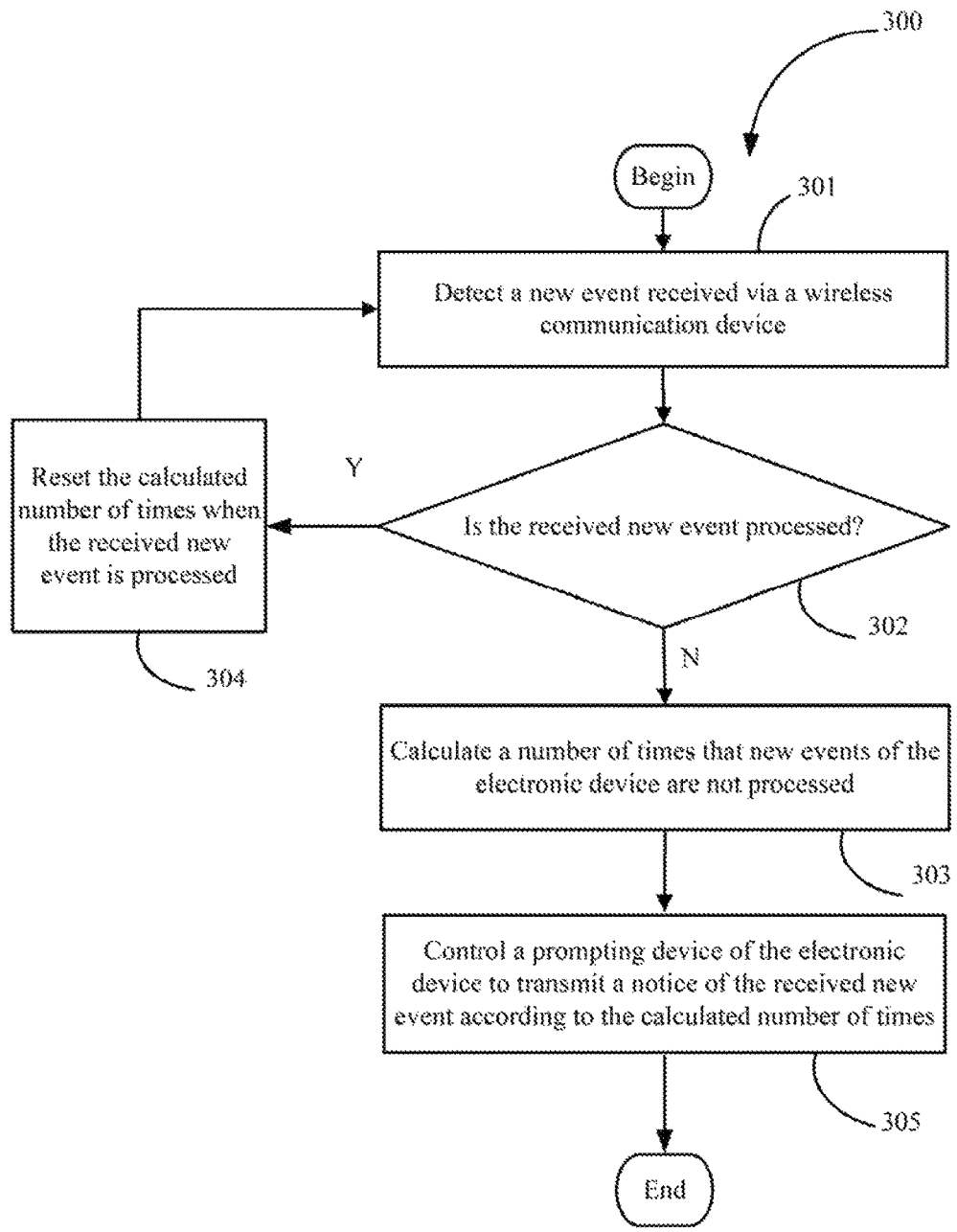
FIG. 3 illustrates a flow chart of one embodiment of a prompting method.

FIG. 3 illustrates a flowchart of one embodiment of a method of correcting a character. The example method 300 is provided by way of example, as there are a variety of ways to carry out the method. The method 300 described below can be carried out using the configurations illustrated in FIG.

1, for example, and various elements of these figures are referenced in explaining example method 300. Each block shown in FIG. 3 represents one or more processes, methods or subroutines, carried out in the exemplary method 300. Additionally, the illustrated order of blocks is by example only and the order of the blocks can be changed according to the present disclosure. The exemplary method 300 can begin at block 301. Depending on the embodiment, additional steps can be added, others removed, and the ordering of the steps can be changed.

At block 301, the detecting module 101 can detect a new event received via the wireless communication module 12. When the received new event is detected, the process goes to block 302.

As mentioned above, the wireless communication device 12 can be the radio frequency transceiving device, or the WIFI device. The new event may include, but are not limited to, the new coming call, the new short message, the new email, and/or other new message received from the predetermined application such as the "Line" of the electronic device 1.

At block 302, the determining module 102 can determine whether the received new event is processed. When the received new event is not processed, the process goes to block 303. When the received new event is processed, the process goes to block 304.

In at least one embodiment, when the received new event is the new coming call, and the new coming call is not answered by a user of the electronic device 1 before the new coming call is hung up, the determining module 102 can determine the received new event is not processed. When the user answers the new coming call before the new coming call is hung up, the determine module 102 can determine the received new event is processed.

In at least one embodiment, when the received new event is the new short message, and the new short message is not read by the user in a predetermined time period, the determining module 102 can determine the received new event is not processed. When the user reads the new short message in the predetermined time period, the determining module 102 can determine the received new event is processed. In at least one embodiment, the predetermined time period can be 2 minutes, 5 minutes or other time period.

Similarly, when the received new event is the new email, and the new email is not read by the user in the predetermined time period, the determining module 102 can determine the received new event is not processed. When the user reads the new email in the predetermined time period, the determining module 102 can determine the received new event is processed.

Similarly, when the received new event is the other new message received from the predetermined application, and the other new message is not read by the user in the predetermined time period, the determining module 102 can determine the received new event is not processed. When the user reads the other new message in the predetermined time period, the determining module 102 can determine the received new event is processed.

At block 303, when the received new event is not processed, the calculating module 103 can calculate a number of times that new events of the electronic device 1 are not processed. The calculating module 103 can further store the calculated number of times in the storage device 14. When the block 303 is implemented, the process goes to block 305.

In at least one embodiment, the calculating module 103 can calculate the number of times using a first calculating method or a second calculating method according to a sender corresponding to the received new event.

In at least one embodiment, when the received new event is the new coming call or the new short message, the sender that corresponds to the received new event is a phone number that sends the new coming call. When the received new event is the new email, the sender that corresponds to the received new event is an email address that sends the new email. When the received new event is the other new message, the sender that corresponds to the received new event is a user name for accessing the predetermined application.

Under the first calculating method, for different types of received new events corresponding to the same sender, the numbers of times that the different types of received new events are not processed are calculated respectively. In other words, each aforementioned number of times encompasses only one type of received new events corresponding to the same sender. For example, the calculating module 103 respectively calculates the number of times of the new coming call being not answered and the number of times of the new short message being not read, if the sender corresponds to the new coming call and the sender corresponds to the new short message is same.

Under the second calculating method, for different types of received new events corresponding to the same sender, the number of times that the different types of received new events are not processed is calculated together. In other words, the aforementioned number of times may encompass multiple types of received new events corresponding to the same sender. For example, the calculating module 103 calculates a total number of times of the new coming call being not answered and the new short message being not read, if the sender corresponds to the new coming call and the sender corresponds to the new short message is same.

For example, when the calculating module 103 calculates the number of times using the first calculating method, it is assumed that the storage device 14 stores that calls send from a phone number "A" are not answered for "T1" times, and new short messages send from the phone number "A" are not read for "T2" times. If the determining module 102 determines a new coming call from the phone number "A" currently detected by the detecting module 101 is not answered, then the calculating module 103 can obtain the number of times that calls send from the phone number "A" are not answered for "T1+1" times. If the detecting module 101 detects a new short message from the phone number "A" in the next moment, and the determining module 102 determines the new short message from the phone number "A" is not read, then the calculating module 103 can obtain the number of times that the new short message from the phone number "A" are not read for "T2+1" times. That is, under the first calculating method, different type of received new events correspond to the same sender are calculated respectively.

For another example, when the calculating module 103 calculates the number of times using the second calculating method, it is assumed that the storage device 14 stores that a total number of times of new events correspond to the phone number "A" is equal to "T3" times ("T3" times is equal to a sum of the number of times of the calls send from the phone number "A" are not answered, and the number of times of the new short messages send from the phone number "A" are not read). If the determining module 102 determines the new coming call from the phone number "A" currently detected by the detecting module 101 is not answered, then the calculating module 103 can obtain the total number of times of new events correspond to the phone number "A" to be "T3+1" times. If the detecting module 101 detects the new short message from the phone number "A" in the next moment, and the determining module 102 determines the new short message from the phone number "A" is not read, then the calculating module 103 can obtain the total number of times of new events correspond to the phone number "A" to be "T3+2" times. That is, under the second calculating method, different type of received new events correspond to the same sender are calculated together.

At block 304, when the received new event is processed, the calculating module 103 can reset the calculated number of times that is stored in the storage device 14. When the block 304 is implemented, the process goes back to block 301.

In at least one embodiment, when the calculated number of times is calculated using the first calculating method at block 303, the calculating module 103 can reset the calculated number of times corresponding to the received new event to be zero at this block 304. In other embodiments, when the calculated number of times is calculated using the second calculating method at block 303, the calculating module 103 can reset the calculated number of times corresponding to the sender of the received new event to be zero at this block 304.

For example, under the first calculating method, when the user answers the call that is currently received from the phone number "A", the calculating module 163 can reset the number of times of the call from the phone number "A" being not answered for zero times. If the user reads the short message that is currently received from the phone number "A" in the predetermined time period, the calculating module 163 can reset the number of times of the short message from the phone number "A" being not read for zero times.

In another example, under the second calculating method, when the user answers the call that is currently received from the phone number "A", the calculating module 163 can reset the total number of times of the call from the phone number "A" and the short message from the phone number "A" being not processed for zero times.

At block 305, the prompting module 104 can inform the user of the received new event according to the calculated number of times.

In at least one embodiment, under the first calculating method, the prompting module 104 can inform the user of the received new event using the prompting device 13 of the electronic device 1. As mentioned above, the prompting device 13 can include one or more prompting unit 131, each of the one or more prompting unit 131 can respectively transmit a different notice. The one or more prompting unit 131 may include, but are not limited to, the display device, the speaker, the vibration device, the lighting device, and/or the alarm device.

For example, the prompting module 104 can control the display device to display a message to inform the user of the received new event. The prompting module 104 can control the speaker to play a predetermined audio file to inform the user of the received new event. The prompting module 104 can control the vibration device to vibrate to inform the user of the received new event. The prompting module 104 can control the lighting device to emit flash light for one or more times to inform the user of the received new event. In at least one embodiment, the lighting device can be any hardware that can emit light, for example, the light device can be a LED. The prompting module 104 can activate the alarm device to inform the user of the received new event.

In at least one embodiment, the prompting module 104 can preset a threshold value for each of the one or more prompting unit 131. The threshold value for each of the one or more prompting unit 131 can be the same or be different. In at least one embodiment, when the prompting module 104 informs the user of the received new event, the prompting module 104 can control at least one prompting unit 131 to transmit the notice. For each of the one or more prompting unit 131, when the calculated number of times is greater than the preset threshold value corresponding to the prompting unit 131, the prompting module 104 can control the prompting unit 131 to transmit the notice.

According to the preset threshold value, when the calculated number of times is smaller, the prompting module 104 can control less of the prompting unit 131 to transmit the notice. When the calculated number of times is increased, the prompting module 104 can control more of the prompting unit 131 to transmit the notice together. When the calculated number of times is greater than a greatest threshold value between all the preset threshold values, the prompting module 104 can control all the prompting unit 131 to transmit the notice together.

In at least one embodiment, a frequency of the prompting device 13 transmitting the notice is in direct proportion to the calculated number of times. For example, as shown in FIG. 4, the frequency of the prompting device 13 transmitting the notice is increased from every 20 minutes to every 5 minutes according to the calculated number of times. In FIG. 4, the one or more prompting unit 131 includes the display device, the lighting device, the vibration device, and the speaker. The preset threshold values respectively correspond to the display device, the lighting device, the vibration device, and the speaker are 0, 3, 5, and 8.

In other embodiments, as shown in FIG. 4, the quantity of the prompting units 131, the types of the prompting units 131, the preset threshold values set for the prompting units 131, and the frequencies of the prompting units 131 transmitting the notice can be adjusted. For example, a smallest threshold value between all of the preset threshold values can be a positive integer, so when the calculated number of times is less than the smallest threshold value between all the preset threshold values, the prompting module 104 does not control any of the prompting unit 131 to transmit the notice.

In other embodiments, the prompting module 104 can also inform the user of the received new event according to the sender corresponds to the received new event. In at least one embodiment, the prompting module 104 can inform the user of the received new event using the above prompting method regardless who is the sender. In other embodiments, the prompting module 104 can preset a list of senders, the prompting module 104 can inform the user of the received new event using the above prompting method when the sender corresponds to the received new event is on the list. When the sender of the received new event is not on the list, the prompting module 104 informs the user of the received new event using a common prompting method, i.e., the prompting method is not changed according to the calculated number of times.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A prompting method using an electronic device, the electronic device comprising a prompting device, the method comprising:
   detecting whether the electronic device receives a new event;
   calculating a total number of times that new events of the electronic device are not processed when the received new event is not processed, wherein the new events of the electronic device which are not processed comprise different types of new events that are not processed, the different types of new events being defined to be new events received through different predetermined applications but corresponding to a same sender; and
   controlling the prompting device to transmit a notice of the received new event according to the total number of times;
   wherein the prompting device comprises a plurality of prompting units, each of the plurality of prompting units transmits a different notice, a number of the prompting units that are controlled to transmit corresponding notice is in direct proportion to the plurality of total number of times.

2. The method according to claim 1, further comprising:
   resetting the total number of times when the received new event is processed.

3. The method according to claim 2, wherein the total number of times is reset to be zero when the received new event is processed.

4. The method according to claim 1, further comprising:
   presetting a threshold value for each of the plurality of prompting units; and
   controlling one of the plurality of prompting units to transmit corresponding notice when the total number of times is greater than the threshold value of the one of the plurality of prompting units.

5. The method according to claim 1, further comprising:
   presetting a list of senders;
   controlling the prompting device to transmit the notice according to the total number of times when a sender of the received new event is on the list; and
   controlling the prompting device to transmit the notice not according to the total number of times when the sender is not on the list.

6. An electronic device, comprising:
   a prompting device;
   at least one processor; and
   a storage device that stores one or more computer-readable programs that, when executed by the at least one processor, causes the at least one processor to:
   detect whether the electronic device receives a new event;
   calculate a total number of times that new events of the electronic device are not processed when the received new event is not processed, wherein the new events of the electronic device which are not processed comprise different types of new events that are not processed, the different types of new events being defined to be new events received through different predetermined applications but corresponding to a same sender; and
   control the prompting device to transmit a notice of the received new event according to the total number of times;
   wherein the prompting device comprises a plurality of prompting units, each of the plurality of prompting units transmits a different notice, a number of the plurality of prompting units that are controlled to transmit corresponding notice is in direct proportion to the total number of times.

7. The electronic device according to claim 6, wherein the at least one processor further caused to:
   reset the total number of times when the received new event is processed.

8. The electronic device according to claim 7, wherein the total number of times is reset to be zero when the received new event is processed.

9. The electronic device according to claim 6, wherein the at least one processor is further caused to:
   preset a threshold value for each of the plurality of prompting units; and
   control one of the plurality of prompting units to transmit corresponding notice when the total number of times is greater than the threshold value of the one of the plurality of prompting units.

10. The electronic device according to claim 6, wherein the at least one processor further caused to:
    preset a list of senders;
    control the prompting device to transmit the notice according to the total number of times when a sender of the received new event is on the list; and
    control the prompting device to transmit the notice not according to the total number of times when the sender is not on the list.

11. A non-transitory storage medium having stored thereon instructions that, when executed by a processor of an electronic device, causes the processor to perform a prompting method, the electronic device comprising a prompting device, wherein the method comprises:
    detecting whether the electronic device receives a new event;
    calculating a total number of times that new events of the electronic device are not processed when the received new event is not processed, wherein the new events of the electronic device which are not processed comprise different types of new events that are not processed, the different types of new events being defined to be new events received through different predetermined applications but corresponding to a same sender; and
    controlling the prompting device to transmit a notice of the received new event according to the total number of times;
    wherein the prompting device comprises a plurality of prompting units, each of the plurality of prompting units transmits a different notice, a number of the plurality of prompting units that are controlled to transmit corresponding notice is in direct proportion to the total number of times.

12. The non-transitory storage medium according to claim 11, wherein the method further comprising:
    resetting the total number of times when the received new event is processed.

13. The non-transitory storage medium according to claim 12, wherein the total number of times is reset to be zero when the received new event is processed.

14. The non-transitory storage medium according to claim 11, wherein the method further comprises:
    presetting a threshold value for each of the plurality of prompting units; and
    controlling one of the plurality of prompting units to transmit corresponding notice when the total number of times is greater than the threshold value of the one of the plurality of prompting units.

15. The non-transitory storage medium according to claim 11, wherein the method further comprises:
- presetting a list of senders;
- controlling the prompting device to transmit the notice according to the total number of times when a sender of the received new event is on the list; and
- controlling the prompting device to transmit the notice not according to the total number of times when the sender is not on the list.

* * * * *